Aug. 2, 1966  C. V. PULLEN ETAL  3,263,702
DE-ICER VALVE
Filed April 6, 1964
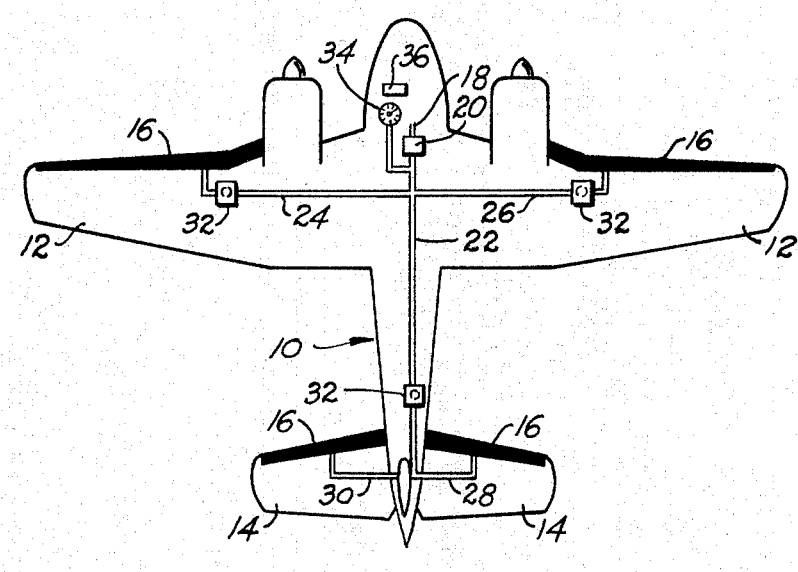
FIG_1
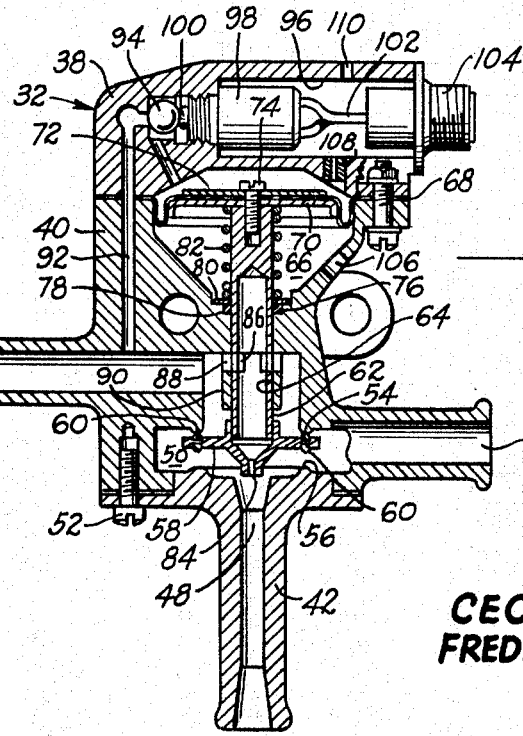
FIG_2
CECIL V. PULLEN.
FREDERICK A. KAISER.
INVENTORS.
BY
William S Thompson
ATTORNEY United States Patent Office 3,263,702
Patented August 2, 1966

3,263,702
DE-ICER VALVE
Cecil V. Pullen and Frederick A. Kaiser, Utica, N.Y., assignors to The Bendix Corporation, Utica, N.Y., a corporation of Delaware
Filed Apr. 6, 1964, Ser. No. 357,583
6 Claims. (Cl. 137—625.64)

The present invention relates to a de-icer valve and more particularly to a valve for controlling distribution and ejection of pressurized air to de-icer boots.

It is an object of the present invention to provide an electrically actuated distributor valve for selectively controlling inflation pressure to de-icer boots.

It is another object of the present invention to provide a combined distributor-ejector valve for alternately applying super and subatmospheric pressure to de-icer boots in response to a control signal.

It is a still further object of the present invention to provide a de-icer valve which dumps air only when exhausting air from a de-icer boot.

It is still another object of the present invention to provide a de-icer valve which in the event of failure fails in a pressure off position and full evacuation of air in a de-icer boot.

Other objects and advantages of the present invention will be apparent on consideration of the accompanying description and drawings wherein:

FIGURE 1 is a schematic drawing of a typical aircraft de-icing system in which the valve of the present invention may be used; and FIGURE 2 is a cross sectional view of a de-icer distributor and ejector valve showing a preferred embodiment of our invention.

Referring to FIGURE 1 in particular there is illustrated an aircraft generally designated by numeral 10 having airfoil wing sections 12 and stabilizer sections 14. At the leading or ice forming edge of each airfoil a resilient inflatable de-icer boot 16 is arranged. In operation, alternate inflation and evacuation of boots 16 removes and prevents the excessive accumulation of ice layers.

Inflation pressure is supplied by engine compressors or other super atmospheric air pressure source (not shown) and is supplied to passage 18 as the inlet passage to the de-icer pressure distribution system. A regulator valve 20 is provided in passage 18 to reduce source pressure to a regulated value. Typical regulated pressure values may for example be within the range of 10 to 22 p.s.i.g. for best system operation, however, it will be understood our invention is not restricted to a pressure within this range.

Inlet passage 18 is connected to three branch or feeder passages 22, 24, and 26. Branch passages 24 and 26 are each in turn connected to boots 16 in the aircraft wing section, whereas passage 22 connects with passages 28 and 30 to supply air to boots 16 in the stabilizer sections. In each of the passages 22, 24 and 26 there is disposed a de-icer valve 32 for controlling the distribution and ejection of air to the de-icer boots. The valves 32 each embody the inventive principles of the present invention and will be discussed in greater detail in connection with the description of FIGURE 2.

The de-icing system is completed by a pressure gauge 34 connected downstream of regulator 20 and a timing mechanism 36 located in the pilot's compartment. Gauge 34 indicates the value of regulated pressure. Timing mechanism 36 is adapted to be connected to each of the distributor valves 32 (connections not shown) to provide a timed electrical actuating signal.

Referring to FIGURE 2 there is shown in detail a de-icer valve assembly designated by numeral 32 having a housing comprised of an upper body portion 38, a lower body portion 40, and an exhaust passage portion 42.

Lower body portion 40 contains a first tubular extension 44 forming an inlet port or passage and a second tubular extension 46 forming an outlet passage or port.

Inlet port 44 is adapted to be connected to a pressurized superatmospheric pressure source such as any of the regulated pressure feeder lines 22, 24, or 26 illustrated in FIGURE 1. Outlet port 46 is the delivery connection to de-icer boots 16.

The exhaust passage portion 42 of our de-icer valve housing is somewhat elongated and has formed internally a contoured mixing and diffusing chamber 48 forming an exhaust port or passage. The exhaust port is preferably connected or dumps to the atmosphere.

Within the lower body portion 40 of the valve housing there is formed a valve chamber 50 which fluidly connects with each of the inlet, outlet and exhaust ports. The valve chamber is in part defined by the exhaust passage portion 42 which forms the lower housing wall and is maintained fixedly in place by screws, one of which is designated by numeral 52.

A pair of annular valve seats 54 and 56 are formed by the housing walls within valve chamber 50 and are parallel and spaced from one another. Intermediate the planes containing valve seats 54 and 56 a generally disc shaped poppet valve 58 is disposed having inlaid rubber grommets 60 aligned with the valve seats to provide a sealed valve closure.

Poppet valve 58 is fixedly secured to the lower end of tubular valve stem 62 which is slidably disposed in a bore 64 formed in the housing. The upper end of valve stem 62 extends into an actuator chamber 66 which contains a diaphragm member 68 secured at its periphery between upper body portion 38 and lower body portion 40 of the housing. Diaphragm 68 is connected at its center by means of the supporting plates 70 and 72 and screw 74 to the upper end of valve stem 62. An O-ring seal 76 is set in a recess 78 in the housing wall concentric and in sealing engagement with valve stem 62. An annular washer 80 confines seal 78 and forms a lower seat for compression spring 82 which is concentric with the valve stem and bears on its upper end against plate 70 urging the combined diaphragm, stem and poppet valve assembly upwardly in a first valve closure position which blocks inlet port 44 and interconnects outlet port 46 and exhaust port 48 as illustrated in FIGURE 2.

Approximately centrally of the poppet valve 58 there is formed a forcing jet nozzle 84 axially aligned to eject air along the axis of the mixing chamber or exhaust port 48. A slot 86 is formed in the side wall of tubular valve stem 62 and cooperates with a complementary slot 88 formed in a stem guide projection 90 of the housing. When the combined poppet valve and stem assembly is in the up or first valve closure position as illustrated in FIGURE 2, slots 86 and 88 are in registry or overlapping relationship cooperatively forming an open valve such that pressurized air from inlet port 44 is transmitted through slots 86 and 88, along the axis of tubular stem 62 to the forcing jet 84 where it is ejected as a high velocity air stream into the exhaust port 48 where it creates a low, subatmospheric pressure. Since the outlet port 46 is connected to exhaust port 48 in the first valve closure position, air is evacuated or aspirated from the boots 16 through its connection with outlet port 46. This arrangement insures that the de-icer boots will be firmly forced against the airfoil surface thus providing a minimum drag condition and preventing flapping of the boots which may cause them to tear or otherwise rapidly deteriorate.

A passage 92 is formed in the de-icer valve housing interconnecting the pressurized inlet port 44 to the upper surface of diaphragm 68. A ball shut-off valve 94 is disposed in passage 92 and is operative when seated to block flow to the diaphragm. A cylindrical bore 96 is formed in the upper body portion 38 and contains an electrically actuated solenoid 98 having a spring loaded plunger 100 abutting ball shut-off valve 94, biasing the shut-off valve in a normally closed position. Electrical leads 102 connect solenoid 98 to connector plug 104 which is adapted to receive an electrical actuating signal either of the programmed type derived from timer 36 (FIGURE 1) or manually selected or the like.

When ball shut-off valve 94 is closed, diaphragm 68 is exposed to atmospheric pressure on both sides. An opening 106 is formed in the sidewall of the housing to vent the lower side of diaphragm 68 whereas the upper side is vented through restriction 108 and opening 110 formed in the upper body portion 38.

On receiving an electrical actuating signal, solenoid 98 withdraws plunger 100 permitting the pressure in passage 92 to force ball shut-off valve 94 off its seat thus permitting the flow of pressurized air to the upper face of diaphragm 68. This creates a pressure differential on the diaphragm opposing and overcoming the force of spring 82 moving the combined diaphragm, stem and poppet valve assembly downward until the poppet valve seats on annular valve seat 56 closing exhaust port 48 and interconnecting inlet and outlet ports 44 and 46 respectively. This defines a second valve closure position whereby pressurized air is connected to the de-icer boots causing their inflation and breaking off or preventing ice accumulation thereon.

When the poppet valve and stem assembly has moved to the second valve closure position slot 86 of the stem 62 has moved out of registery with the slot 88 thus shutting off the fluid supply to forcing jet 84 which is no longer required and which would provide an unnecessary system air drain.

Although the present invention has been described in conjunction with only a single selected embodiment, it will be understood that the principles of the invention are capable of general application and that those skilled in the art can be expected to make variations dictated by design requirements. It is intended, therefore, that such variations as are reasonably expected on the part of those skilled in the art and which incorporate the herein disclosed principles will be included within the scope of the following claims.

We claim:

1. A de-icer valve assembly for controlling the distribution of pressurized air from a source to an inflatable de-icer boot comprising: a housing having walls defining a valve chamber, a pressurized air inlet port connected to said housing and fluidly connected to said valve chamber, an outlet port connected to said valve chamber and adapted to be connected to an inflatable de-icer boot, an exhaust port connected to said valve chamber, a movable poppet valve disposed in said valve chamber having first and second valve closure positions, said poppet valve member operative in said first closure position to block said inlet port and interconnect said outlet and exhaust ports, said poppet valve member operative in said second closure position to block said exhaust port and interconnect said inlet and outlet ports, resilient means operative to normally bias said poppet valve member in said first closure position, actuator means for moving said poppet valve member to said second position in response to an actuating control signal, forcing jet nozzle axially aligned with said exhaust port, and passage means fluidly interconnecting said inlet port and said forcing jet nozzle when said poppet valve member is in said first closure position to create a subatmospheric pressure in said exhaust port.

2. A de-icer valve assembly for controlling the distribution of pressurized air from a source to an inflatable de-icer boot comprising: a housing having walls defining a valve chamber, a pressurized air inlet port connected to said housing and fluidly connected to said valve chamber, an outlet port connected to said valve chamber and adapted to be connected to an inflatable de-icer boot, an exhaust port connected to said valve chamber, a movable poppet valve disposed in said valve chamber having first and second valve closure positions, said poppet valve member operative in said first closure position to block said inlet port and interconnect said outlet and exhaust ports, said poppet valve member operative in said second closure position to block said exhaust port and interconnect said inlet and outlet ports, resilient means operative to normally bias said poppet valve member in said first closure position, actuator means for moving said poppet valve member to said second closure position in response to an actuating control signal, a forcing jet nozzle member formed in said poppet valve and aligned axially with said exhaust port, passage means interconnecting said inlet port and said forcing jet nozzle, said passage means including shut-off valve means responsive to movement of said poppet valve to permit flow to said forcing nozzle when said poppet valve is in said first closure position and block flow when said poppet valve is in said second position to create a subatmospheric pressure in said exhaust port when said poppet valve is in said first closure position.

3. A de-icer valve assembly for controlling the distribution of pressurized air from a source to an inflatable de-icer boot comprising: a housing having walls defining a valve chamber, a pressurized air inlet port connected to said valve chamber, an outlet port connected to said valve chamber and adapted to be connected to an inflatable de-icer boot, an exhaust port connected to said valve chamber, a movable poppet valve disposed in said valve chamber having first and second valve closure positions, said poppet valve member operative in said first closure position to block said inlet port and interconnect said outlet and exhaust ports, said poppet valve member operative in said second closure position to block said exhaust port and interconnect said inlet and outlet ports, a tubular valve guide member slidably disposed in a wall of said housing and fixedly secured on one end to said poppet valve, resilient means connected to the other end of said tubular valve guide member to normally bias said poppet valve member in said first closure position, actuator means operative to supply a force to said tubular valve guide member opposing said resilient means for moving said poppet valve member to said second closure position in response to an actuating control signal, a forcing jet nozzle formed in said poppet valve and aligned axially with said exhaust port, said forcing jet nozzle fluidly connected to the interior of said tubular valve guide member, valve means formed in said tubular valve guide member fluidly connecting said inlet port and said forcing nozzle when said poppet valve is in said first closure position to create a subatmospheric pressure in said exhaust port, said valve means operative to block fluid communication when said poppet valve is in said second closure position.

4. A de-icer valve assembly as claimed in claim 3 wherein said actuator means is comprised of a diaphragm secured to said other end of said tubular valve guide member, control passage means interconnecting said inlet port and one side of said diaphragm to supply an actuating pressure thereto, shut-off valve means disposed in said control passage means for selectively blocking and permitting said actuating pressure transmission to said diaphragm, and solenoid means responsive to an electrical control signal operative to control said check valve means.

5. A de-icer valve assembly as claimed in claim 3 wherein said valve means is comprised of a first slot formed in said tubular guide member and a second slot formed in the wall of said housing and communicating with said inlet port, said first and second slots being relatively spaced to overlap when said poppet valve is in said first closure position and to be out of registry when said poppet valve is in said second closure position.

6. A de-icer valve assembly as claimed in claim 3 including a pair of parallel spaced annular valve seats, said poppet valve member abutting a first one of said pair of valve seats in said first closure position and a second one of said pair of valve seats in said second closure position.

References Cited by the Examiner
UNITED STATES PATENTS

| | | | |
|---|---|---|---|
| 2,337,426 | 12/1943 | Taylor et al. | 244—134 |
| 2,420,137 | 5/1947 | Hunter | 244—134 |
| 2,574,556 | 11/1951 | Good | 137—625.68 |
| 2,594,962 | 4/1952 | McDonald | 230—112 |
| 2,840,110 | 6/1958 | Parsons | 137—625.27 |
| 3,188,148 | 6/1965 | Eaton | 137—625.64 X |

M. CARY NELSON, *Primary Examiner.*

H. KLINKSIEK, *Examiner.*